April 13, 1954 W. BOYD ET AL 2,674,844
FLEXIBLE COUPLING BETWEEN TAIL CONE AND JET PIPE
Filed April 4, 1951 3 Sheets-Sheet 1

INVENTORS
W. BOYD
A. E. PASHLEY
PER
ATTORNEY

April 13, 1954

W. BOYD ET AL 2,674,844

FLEXIBLE COUPLING BETWEEN TAIL CONE AND JET PIPE

Filed April 4, 1951

INVENTORS
W. BOYD
A.E. PASHLEY
PER

ATTORNEY.

April 13, 1954 W. BOYD ET AL 2,674,844
FLEXIBLE COUPLING BETWEEN TAIL CONE AND JET PIPE
Filed April 4, 1951 3 Sheets-Sheet 3
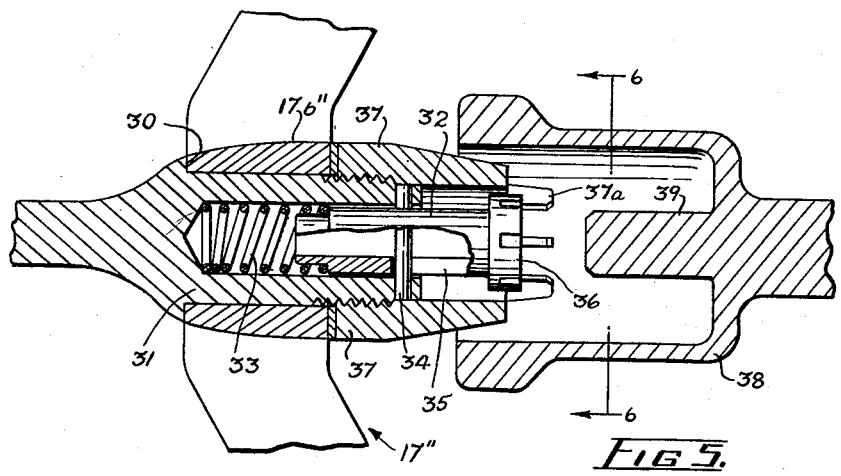
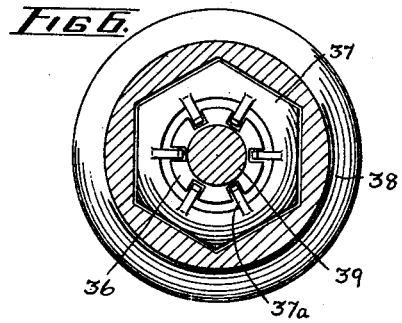
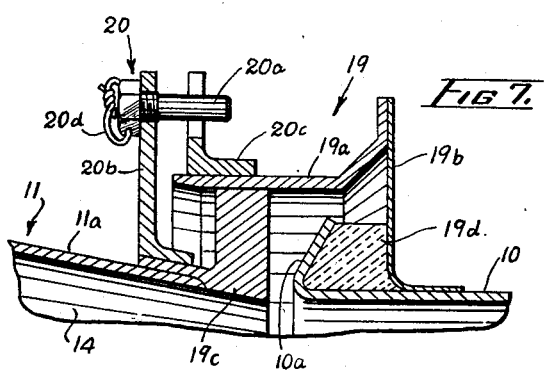
INVENTORS
W. BOYD
A. E. PASHLEY
PER
ATTORNEY Patented Apr. 13, 1954

2,674,844

UNITED STATES PATENT OFFICE 2,674,844

FLEXIBLE COUPLING BETWEEN TAIL CONE AND JET PIPE

Winnett Boyd, Bobcaygeon, Ontario, and Arthur Edward Pashley, Toronto, Ontario, Canada, assignors to A. V. Roe Canada Limited, Malton, Ontario, Canada, a corporation Application April 4, 1951, Serial No. 219,148

11 Claims. (Cl. 60—35.6)

This invention pertains to improvements in the means of coupling the jet pipes to the tail cones of aircraft gas turbine engines.

To facilitate installation of a gas turbine engine in an aircraft, particularly when the engine is mounted in a nacelle in the wing, it has been found desirable to install the engine and its jet pipe separately in the airframe and then to make the joint between the jet pipe and the tail cone assembly of the engine as a subsequent operation. However as this procedure usually necessitates the provision of access doors in the nacelle or other surrounding aircraft structure, it results in a heavy and complex structure and the discontinuities formed in the smooth surface by the access doors detract from aerodynamic efficiency. Furthermore it has been standard practice in the past to couple the jet pipe to the tail cone assembly by fastening the jet pipe to the periphery of the outer casing of the tail cone assembly, thus producing a long and substantially rigid structure in which distortion under the applied thrust and temperature loading, and the flexure of the airframe in flight, are liable to introduce indeterminate stresses and perhaps even failure.

The main object of this invention is to provide a coupling between the tail cone and jet pipe which is flexible and yet strong enough to withstand the loads imposed upon it by normal operation. Another object of the invention is to provide between the aforesaid two components a coupling which can be readily assembled and disassembled. Other objects and advantages will become apparent during the course of the following description.

In the accompanying drawings forming a part of this application and in which like characters are used to designate like parts throughout the several views:

Figure 5 is a fragmentary sectional view on a still larger scale of the locking nut assembly and of a wrench for the assembly shown in Figure 4;

Figure 6 is a sectional view taken along the line 6—6 in Fig. 5; and

Figure 7 is a fragmentary sectional view of the peripheral seal shown in Figure 2, but on a still larger scale.

Figure 1:
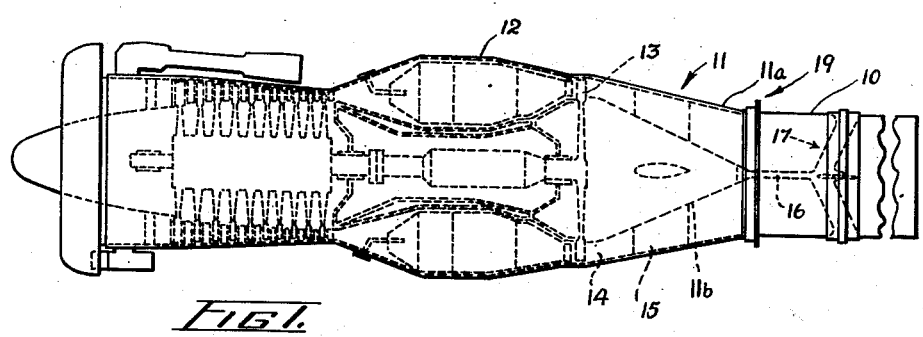
Figure 1 is a side view of a gas turbine engine with its jet pipe, shown partly broken away, attached in accordance with this invention, various major components of the engine being generally indicated by dotted lines.

It will be seen from Figure 1 that a jet pipe 10 is coupled to a tail cone assembly 11, of a gas turbine engine 12. The purpose of the jet pipe is to conduct the exhaust gases from the turbine 13 of the engine to the outside of the aircraft. The jet pipe is normally cylindrical but not necessarily straight, since an irregular shape may be required to conform to the essential structural features of the aircraft in which it is installed.

The tail cone assembly 11 comprises an annular casing or outer member 11a and an inner member 11b, known as the tail bullet, which is substantially conical and which is supported in spaced relationship within the outer member 11a to provide an annular space 14 through which the exhaust gases from the turbine are discharged. Cruciform struts 15 spanning the annular space 14 serve to support the tail bullet within the assembly.

The main coupling of the jet pipe 10 to the tail cone assembly 11 is effected by a somewhat flexible tie rod 16 and a spider, generally indicated by reference numeral 17, situated within the upstream end of the jet pipe and secured to the apex of the tail bullet 11b. A flexible gas-tight seal, generally indicated by reference numeral 19, is provided at the peripheral juncture of the outer member 11a of the tail cone and the jet pipe.

From the drawings, particularly from Figure 7, it will be seen that, around the circumference, the jet pipe 10 is axially spaced from the outer member 11a of the tail cone but registers therewith by means of the aforementioned seal 19. This seal includes a forwardly extending sleeve 19a mounted on the outer periphery of a thin annular diaphragm 19b which is attached at its inner periphery to the surface of the jet pipe. The sleeve 19a slides axially over a spigot flange 19c mounted at the downstream end of the outer member 11a of the tail cone, leaving an annular space between the flange 19c and the diaphragm 19b. This annular space is partially filled with resilient insulating material 19d between the diaphragm 19b and a rim 10a on the upstream end of the jet pipe 10. A locking device 20 for preventing relative rotation of the tail cone and jet pipe may be mounted on the seal as hereafter described. This seal 19 constitutes a flexible coupling which is stiff in the radial plane but flexible in an axial direction. When the seal assembly is cold the sleeve 19a slides easily over the spigot flange 19c, but when the engine is operating the flange 19c, being in contact with the hot gases in the annular space 14, becomes appreciably hotter than the sleeve 19a which is protected from the said gases by the insulating material 19d; in consequence the flange expands relatively to the sleeve and binds thereon to form a gas-tight joint. The seal is flexible by virtue of the diaphragm 19b.

Figure 2:
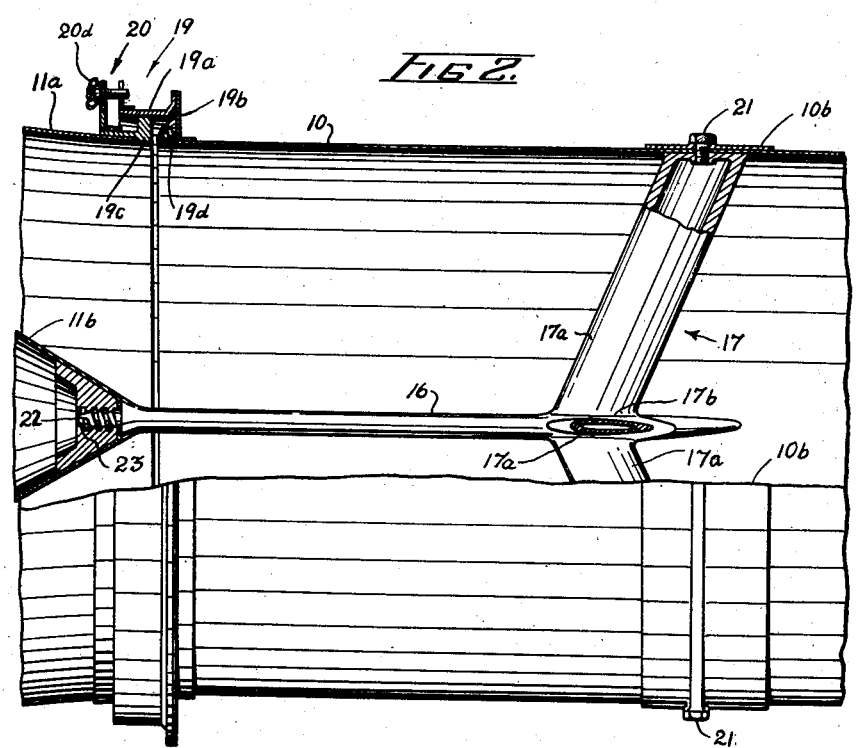
Figure 2 is a partially sectional view, on an enlarged scale, of part of the tail cone assembly and the jet pipe.

There are several constructions by which the jet pipe may be removably attached to the tail cone by means of the rod 16 and the spider 17. For example if the jet pipe is straight and coaxial with the tail cone throughout its length, the rod 16 may be integral with the spider 17 as is shown in Figure 2. The spider 17 comprises four support vanes 17a which extend radially and slightly rearwardly (to accommodate thermal expansion) from the spider hub 17b to the walls of the jet pipe 10, to which they are attached by setscrews 21; the walls of the jet pipe are reinforced locally by a band 10b through which the aforesaid setscrews pass. From the hub 17b the tie-rod 16 extends forwardly to the apex of the tail bullet 11b and carries at its forward end a male thread 22, which is heavily silver-plated to avoid seizing and which will register with a female thread 23 apically situated in the tail bullet; this registration is facilitated by the provision of a pronounced lead on the male thread. The coupling of the jet pipe to the tail cone, according to this construction, is effected by first sliding the sleeve 19a over the flange 19c, thereby centering the jet pipe relative to the tail cone and guiding the threaded end of the rod 16 into the threaded apex of the tail bullet 11b, and subsequently rotating the whole jet pipe to screw the rod home. If the downstream end of the jet pipe is supported in a manner which will prevent rotation after assembly, no further locking of the coupling to the tail cone is required; but on the other hand, if the method of suspension is such as to permit rotation, for example if the jet pipe is suspended in the aircraft by means of a plain circular hoop, some locking device for the coupling must be provided. In the construction illustrated in Figures 2 and 7 this device takes the form of a single setscrew 20a which is inserted, after the coupling operation, in a bracket 20b mounted on the outer member 11a of the tail cone; the setscrew has an extension which is engageable with a forked lug 20c on the sleeve 19a, thereby preventing further relative rotation between the jet pipe and the tail cone. The setscrew 20a is itself locked against unscrewing by a wire 20d. In most installations it is possible to locate this simple locking device so that it can be reached through an opening or access door provided primarily for some other purpose.

Figure 3:
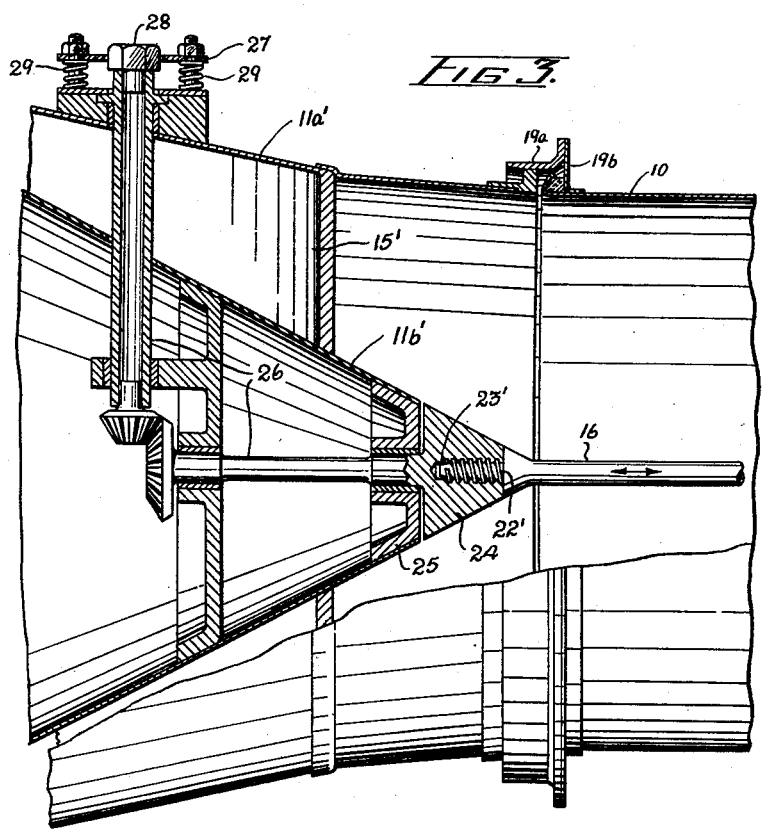
Figure 3 is a fragmentary sectional view illustrating a modified coupling between the jet pipe and the tail cone assembly.

If the jet pipe is not straight, so that the coupling cannot be effected by rotating the pipe, the device shown in Figure 3 can be employed. In this construction a female thread 23' at the apex of a tail bullet 11b' is carried in a nut 24 rotatably mounted in a bearing 25 and remotely actuated, from a point outside the outer member 11a' of the tail cone, by a bevel gear mechanism 26 led through one of the cruciform struts 15' by which the tail bullet is supported. The nut 24 may be locked against rotation after assembly by a lock-plate 27 which is adapted to engage the hexagonal head 28 of the bevel gear mechanism and which is mounted on springs 29 so that it may be released automatically by the application of a wrench to the said head.

Figure 4:
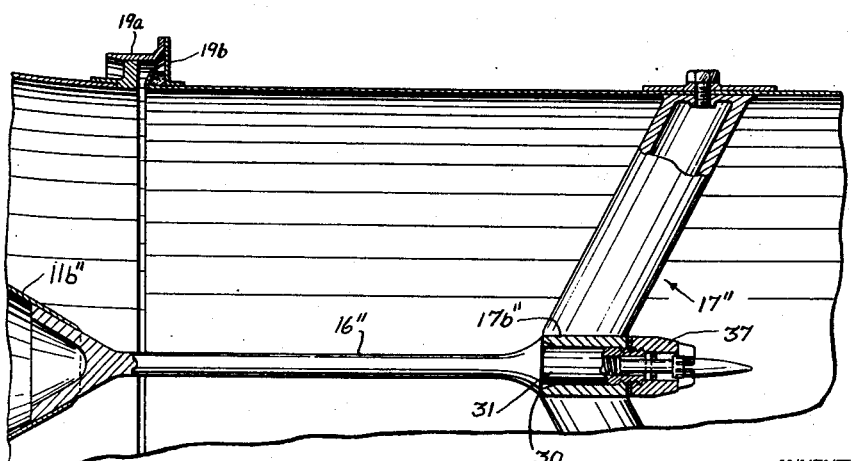
Figure 4 is a fragmentary sectional view showing still another coupling between the jet pipe and the tail cone.

Figure 4 shows yet another construction which may be used in installations requiring an irregularly shaped or oblique jet pipe. According to this construction the hub 17b'' of a spider 17'' is hollow and a rod 16'' is attached as a permanent extension of a tail bullet 11b''. The downstream end of the rod is shouldered at 30 to engage the hub of the spider, and a partially threaded cylindrical extension 31 of the rod 16'' passes through the hub. The said extension, which is shown more clearly in Figure 5, is hollow to accommodate a locking device, comprising a hollow plunger 32 and a spring 33 which urges the plunger outwardly in a downstream direction. The plunger is prevented from rotating relative to the rod by a rivet 34, which is fastened transversely in the rod and passes through a longitudinal slot 35 in the plunger, thereby permitting longitudinal displacement of the plunger while preventing rotation. As shown in Figures 5 and 6, the plunger has a crown 36 which, when the plunger is at its full travel under the influence of the spring, is adapted to engage the internal serrations 37a of a special nut 37 threaded on the extensions 31. In this construction the coupling is effected in the same manner as previously described, except that in this instance the extension 31 of the rod 16'' is inserted into the hub of the spider 17'' and the special nut 37 is rotated by a long-handled socket wrench 38 manipulated from the rear or downstream end of the pipe. The wrench has a central protuberance 39 which serves to depress the plunger 32 against the spring 33 in order to disengage the crown 36 from the serrations 37a during the tightening or removal of the nut.

Those skilled in the art will recognise that the construction is particularly suitable for use in installations embodying reheat or afterburner equipment, wherein the components of the afterburner may be mounted on the radiating support vanes of the spider 17. It will be readily understood therefore that variations in the shape, size and arrangement of the detailed parts of the assembly may be embodied without departing from the characteristic features of the invention.

What we claim as our invention is:

1. In an aircraft, a gas turbine engine having a turbine and a tail cone through which the exhaust gases from the turbine are discharged, the said tail cone having an annular outer member and a substantially conical inner member supported in spaced relationship within the outer member; a jet pipe in peripherally registering relationship with the annular outer member to conduct the said exhaust gases from the tail cone; flexible attaching means extending from the apex of the said inner member to the jet pipe to secure it to the tail cone, means manipulable from outside the tail cone and jet pipe for connecting the attaching means; and means between the adjacent peripheral edges of the jet pipe and the said outer member for sealing said edges and positioning the pipe relative to said outer member.

2. In an aircraft, a gas turbine engine having a turbine and a tail cone through which the exhaust gases from the turbine are discharged, the said tail cone having an annular outer member and a substantially conical inner member supported in spaced relationship within the outer member; a jet pipe in peripherally registering relationship with the annular outer member to conduct the said exhaust gases from the tail cone; attaching means, including a flexible rod extending from the apex of the said inner member and means connecting the said flexible rod to the jet pipe to secure the jet pipe to the tail cone, means manipulable from outside the tail cone and jet pipe for connecting the attaching means; and flexible sealing means between the adjacent peripheral edges of the jet pipe and the said outer member.

3. In an aircraft, a gas turbine engine having a turbine and a tail cone through which the exhaust gases from the turbine are discharged, the said tail cone having an annular outer member and a substantially conical inner member supported in spaced relationship within the outer member; a jet pipe in peripherally registering relationship with the annular outer member to conduct the said exhaust gases from the tail cone; attaching means to secure the jet pipe to the tail cone, comprising a spider secured within the jet pipe and having a hub, and a flexible rod connecting the said hub to the apex of the said inner member, means manipulable from outside the tail cone and jet pipe for connecting the attaching means; and sealing means between the adjacent peripheral edges of the jet pipe and the said outer member.

4. In an aircraft, a gas turbine engine having a turbine and a tail cone through which the exhaust gases from the turbine are discharged, the said tail cone having an annular outer member and a substantially conical inner member supported in spaced relationship within the outer member; a jet pipe in peripherally registering relationship with the annular outer member to conduct the said exhaust gases from the tail cone; attaching means to secure the jet pipe to the tail cone, comprising a spider secured within the jet pipe and having a hub, and a flexible rod connecting the said hub to the apex of the said inner member, means manipulable from outside the tail cone and jet pipe for connecting the attaching means; and means providing radial support and a substantially gas-tight seal between the adjacent peripheral edges of the jet pipe and the said outer member.

5. In an aircraft, a gas turbine engine having a turbine and a tail cone through which the exhaust gases from the turbine are discharged, the said tail cone having an annular outer member and a substantially conical inner member supported in spaced relationship within the outer member; a jet pipe arranged in peripherally registering relationship with the annular outer member to conduct the said exhaust gases from the tail cone; attaching means to secure the jet pipe to the tail cone member, comprising a spider secured within the jet pipe and having a hub, and a flexible rod connecting the said hub to the apex of the said inner member, means manipulable from outside the tail cone and jet pipe for connecting the attaching means; and an annular flexible diaphragm mounted externally on one of the jet pipe and the said outer member, a spigot flange mounted on the other of the jet pipe and the said outer member, and a sleeve carried on the outer periphery of the said diaphragm and slidably engaging the spigot flange.

6. In an aircraft, a gas turbine engine having a turbine and a tail cone through which the exhaust gases from the turbine are discharged, the said tail cone having annular outer member and a substantially conical inner member supported in spaced relationship within the outer member; a jet pipe in peripherally registering relationship with the annular outer member to conduct the said exhaust gases from the tail cone; attaching means extending from the apex of the said inner member to the jet pipe to secure it to the tail cone, means manipulable from outside the tail cone and jet pipe for connecting the attaching means; and an annular radial diaphragm externally mounted on the periphery of the jet pipe, a spigot flange mounted on the said outer member, a sleeve carried on the outer periphery of the said diaphragm and slidably engaging the spigot flange, and heat insulating material between the sleeve and the jet pipe.

7. In an aircraft, a gas turbine engine having a turbine and a tail cone through which the exhaust gases from the turbine are discharged, the said tail cone having an annular outer member and a substantially conical inner member supported in spaced relationship within the outer member; a jet pipe arranged in peripherally registering relationship with the annular outer member to conduct the said exhaust gases from the tail cone; attaching means to secure the jet pipe to the tail cone, comprising a spider secured within the jet pipe and having a hub, a flexible rod connecting the said hub to the apex of the said inner member, the said rod having a thread at one end, and one of the said hub and the said apex being threaded to engage the said thread of the rod; and means providing radial support and a substantially gas-tight seal between the adjacent peripheral edges of the jet pipe and the said outer member.

8. In an aircraft, a gas turbine engine having a turbine and a tail cone through which the exhaust gases from the turbine are discharged, the said tail cone having an annular outer member and a substantially conical inner member supported in spaced relationship with the outer member; a jet pipe arranged in peripherally registering relationship with the annular outer member to conduct the said exhaust gases from the tail cone; attaching means to secure the jet pipe to the tail cone, comprising a spider secured within the jet pipe and having a hub, a flexible rod attached at one end to the hub and threaded at the other end, the apex of the conical inner member being threaded to engage the said threaded other end of the rod; flexible sealing means between the adjacent peripheral edges of the jet pipe and the said outer member; and locking means to prevent rotation of the jet pipe relative to the tail cone.

9. In an aircraft, a gas turbine engine having a turbine and a tail cone through which the exhaust gases from the turbine are discharged, the said tail cone having an annular outer member and a substantially conical inner member supported in spaced relationship with the outer member; a jet pipe arranged in peripherally registering relationship with the annular outer member to conduct the said exhaust gases from the tail cone; attaching means to secure the jet pipe to the tail cone, comprising a spider secured within the jet pipe and having a hub, a flexible rod attached at one end to the hub and threaded at the other end, a rotatable threaded member at the apex of the said conical inner member, and rotatable means extending outside the said outer member and geared to the said rotatable threaded member for rotating the rotatable threaded member to engage the threaded end of the rod; and flexible sealing means between the adjacent peripheral edges of the jet pipe and the said outer member.

10. In an aircraft, a gas turbine engine having a turbine and a tail cone through which the exhaust gases from the turbine are discharged, the said tail cone having an annular outer member and a substantially conical inner member supported in spaced relationship with the outer member; a jet pipe arranged in peripherally registering relationship with the annular outer member to conduct the said exhaust gases from the tail cone; attaching means to secure the jet pipe to the tail cone, comprising a spider secured within the jet pipe and having a hub, a flexible rod secured at one end to the apex of the said conical inner member of the tail cone and removably attached at the other end to the hub; and flexible sealing means between the adjacent peripheral edges of the jet pipe and the said outer member.

11. In an aircraft, a gas turbine engine having a turbine and a tail cone through which the exhaust gases from the turbine are discharged, the said tail cone having an annular outer member and a substantially conical inner member supported in spaced relationship with the outer member; a jet pipe arranged in peripherally registering relationship with the annular outer member to conduct the said exhaust gases from the tail cone; attaching means to secure the jet pipe to the tail cone, comprising a spider secured within the jet pipe and having a hub with an axial bore, a flexible rod secured at one end to the apex of the said conical inner member of the tail cone and protruding at the other end through the axial bore of the hub, the protruding portion of the rod being threaded, and a lock nut threaded on the protruding portion of the rod; and flexible sealing means between the adjacent peripheral edges of the jet pipe and the said outer member.

References Cited in the file of this patent

UNITED STATES PATENTS

| Number | Name | Date |
|---|---|---|
| 1,639,225 | Grace | Aug. 16, 1927 |
| 2,494,659 | Huyton | Jan. 17, 1950 |
| 2,510,506 | Lindhagen et al. | June 6, 1950 |
| 2,557,883 | Miller | June 19, 1951 |
| 2,580,207 | Whittle | Dec. 25, 1951 |
| 2,603,945 | Brown | July 22, 1952 |

FOREIGN PATENTS

| Number | Country | Date |
|---|---|---|
| 619,915 | Great Britain | Jan. 13, 1949 |